United States Patent
Butcher et al.

(10) Patent No.: US 10,012,389 B2
(45) Date of Patent: Jul. 3, 2018

(54) CASE WITH INTEGRAL HEAT SHIELDING

(71) Applicant: United Technologies Corporation, Hartford, CT (US)

(72) Inventors: Evan Butcher, Manchester, CT (US); Lyutsia Dautova, Rocky Hill, CT (US); Wendell V. Twelves, Jr., Glastonbury, CT (US); Joe Ott, Enfield, CT (US)

(73) Assignee: United Technologies Corporation, Farmington, CT (US)

( * ) Notice: Subject to any disclaimer, the term of this patent is extended or adjusted under 35 U.S.C. 154(b) by 397 days.

(21) Appl. No.: 14/695,244

(22) Filed: Apr. 24, 2015

(65) Prior Publication Data

US 2015/0323183 A1    Nov. 12, 2015

Related U.S. Application Data

(60) Provisional application No. 61/990,323, filed on May 8, 2014.

(51) Int. Cl.
| | |
|---|---|
| *F02C 1/00* | (2006.01) |
| *F23R 3/60* | (2006.01) |
| *F23R 3/00* | (2006.01) |
| *F01D 25/24* | (2006.01) |
| *F02C 7/30* | (2006.01) |
| *F16L 57/00* | (2006.01) |
| *F16L 57/06* | (2006.01) |
| *F16L 23/032* | (2006.01) |

(52) U.S. Cl.
CPC .............. *F23R 3/60* (2013.01); *F01D 25/243* (2013.01); *F02C 7/30* (2013.01); *F23R 3/002* (2013.01); *F05D 2240/15* (2013.01); *F05D 2260/38* (2013.01); *F05D 2260/95* (2013.01); *F16L 23/032* (2013.01); *F16L 57/005* (2013.01); *F16L 57/06* (2013.01); *F23R 2900/00005* (2013.01)

(58) Field of Classification Search
CPC ...... F01D 5/143; F01D 25/265; F01D 25/243; F01D 25/246
See application file for complete search history.

(56) References Cited

U.S. PATENT DOCUMENTS

| | | | | |
|---|---|---|---|---|
| 3,365,173 | A * | 1/1968 | Lynch | F01D 9/042 415/209.2 |
| 3,826,082 | A * | 7/1974 | Smuland | F23R 3/08 60/757 |
| 5,071,313 | A * | 12/1991 | Nichols | F01D 25/246 415/134 |
| 5,593,276 | A * | 1/1997 | Proctor | F01D 11/18 415/138 |
| 5,660,526 | A * | 8/1997 | Ress, Jr. | F01D 5/02 416/198 A |
| 6,227,575 | B1 * | 5/2001 | Monning | F01D 25/243 285/187 |

(Continued)

*Primary Examiner* — Gerald L Sung
(74) *Attorney, Agent, or Firm* — Kinney & Lange, P.A.

(57) ABSTRACT

A duct includes an upstream segment and a downstream segment mounted to the upstream segment. A heat shield extends from one of the upstream and downstream segments. A sealing land extends from the other of the upstream and downstream segments, and is configured to engage with the heat shield. The heat shield protects the interface between the upstream and downstream segments of the ducts.

17 Claims, 5 Drawing Sheets

(56) References Cited

U.S. PATENT DOCUMENTS

| | | | | |
|---|---|---|---|---|
| 7,316,057 B2* | 1/2008 | Seth | ............ | B21K 1/36 29/458 |
| 2003/0131603 A1* | 7/2003 | Bolender | ............ | F23R 3/002 60/772 |
| 2004/0223846 A1* | 11/2004 | Taylor | ............ | F01D 11/14 415/200 |
| 2006/0059889 A1* | 3/2006 | Cardarella, Jr. | ............ | F01D 21/045 60/226.1 |
| 2006/0193721 A1* | 8/2006 | Adam | ............ | F01D 25/145 415/177 |
| 2011/0044804 A1* | 2/2011 | DiPaola | ............ | F01D 9/04 415/173.1 |

\* cited by examiner

CASE WITH INTEGRAL HEAT SHIELDING

CROSS-REFERENCE TO RELATED APPLICATION(S)

This application claims the benefit of U.S. Provisional Application No. 61/990,323 filed May 8, 2014 for "Case with Integral Heat Shielding" by E. Butcher, L. Dautova, W. Twelves, Jr., and J. Ott.

BACKGROUND

Ducts that route high temperature, high velocity working fluids are subjected to hot gas scrubbing. Hot gas scrubbing is erosion caused by impingement of the working fluid on unprotected surfaces. Discontinuities in the wall of a duct, such as those present where two duct segments abut one another, are particularly prone to hot gas scrubbing. Many known ducts, such as those used in gas turbine engines, include two duct segments each having a flange. The flanges are bolted together to connect the duct segments, leaving only a seam on the inner radial surface of the duct. Nonetheless, this seam is prone to erosion and, in severe cases, flange cracking caused by thermal gradients between the inside diameter of the flange and the outside diameter of the flange, and the cyclical loading caused by expansion and contraction due to thermal cycling.

SUMMARY

In one aspect, a duct includes an upstream segment and a downstream segment mounted to the upstream segment. A heat shield extends from one of the upstream and downstream segments. A sealing land extends from the other of the upstream and downstream segments, and is configured to engage with the heat shield.

In another aspect, a duct includes an upstream segment having an upstream annular portion and an upstream flange extending radially outward from the upstream annular duct portion and partially defining a bolt hole. The duct also includes a downstream segment mounted to the upstream segment, the downstream segment having a downstream annular portion mounted to the upstream annular portion and a downstream flange extending radially outward from the downstream annular duct portion and partially defining the bolt hole. A heat shield extends from one from the upstream and downstream segments.

In a further aspect, a duct includes an upstream segment, a downstream segment mounted to the upstream segment, and a heat shield extending from one of the upstream and downstream segments. The heat shield is separated from the upstream and downstream segments by a plenum defined in part by the heat shield and the upstream and downstream segments.

DETAILED DESCRIPTION

Connecting points between ducts are susceptible to damage due to scrubbing by hot gasses contained within the duct. This damage can be either erosion of the connecting region, or in some cases can result in flange cracking due to thermal gradient induced stress. By forming a heat shield integral with the upstream portion of a duct, a pocket of still air can be created at the junction of two duct segments, reducing the severity of the thermal gradient and preventing damage from occurring. Thermally compliant gussets can provide additional structural support.

Figure 1:
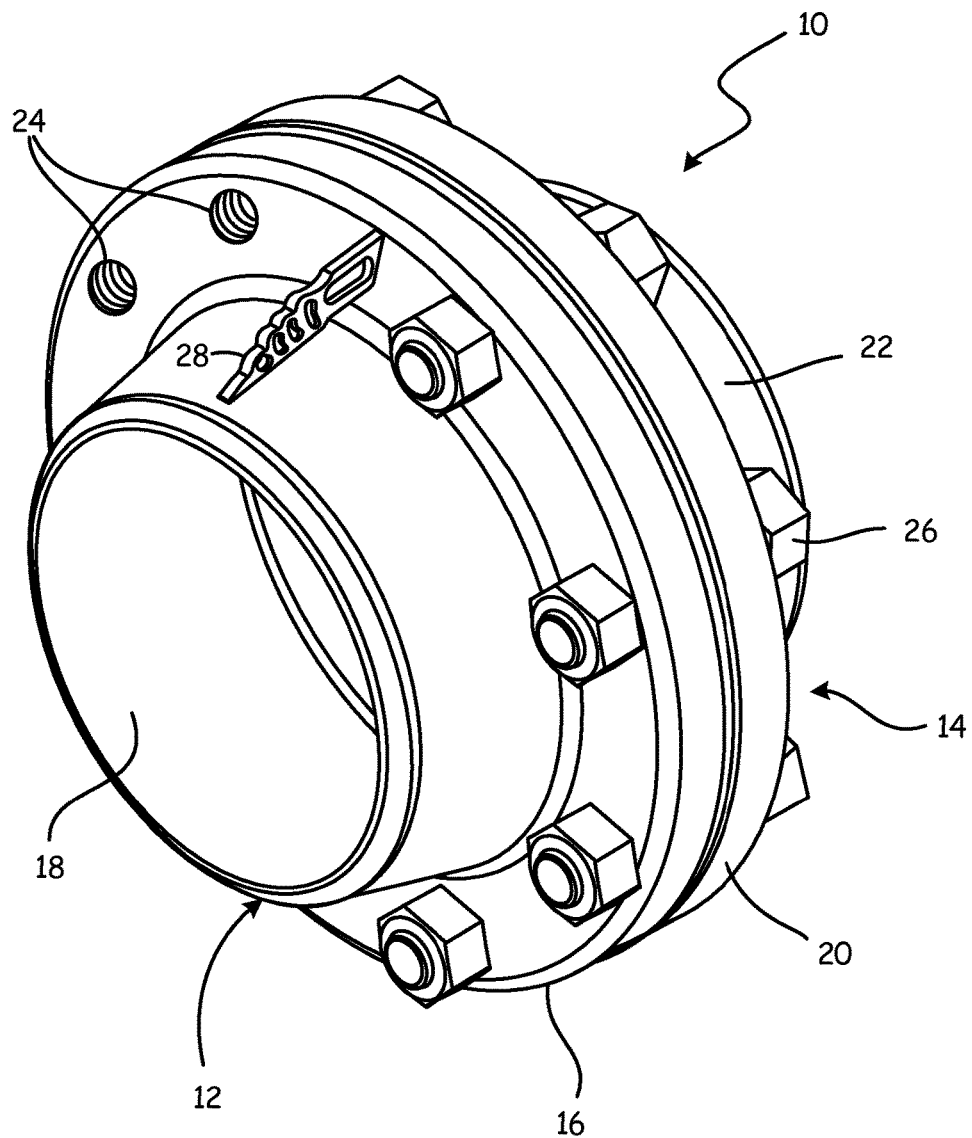
FIG. 1 is a perspective view of two duct segments bolted together via flanges.

FIG. 1 is a perspective view of duct 10, which includes upstream duct portion 12 and downstream duct portion 14. Upstream duct portion 12 includes upstream flange 16 and upstream annular portion 18. Downstream duct portion 14 includes downstream flange 20 and downstream annular portion 22. Upstream flange 16 and downstream flange 20 abut one another and define bolt-holes 24. Upstream annular portion 18 and downstream annular portion 22 combine to form a fluid passageway in which working fluid can pass through duct 10.

Bolts 26 hold upstream duct portion 12 to downstream duct portion 14. Thermally compliant gussets 28 are integrally attached between upstream flange 16 and upstream annular portion 18. Upstream duct portion 12 and downstream duct portion 14 respectively extend from flanges 16, 20 in upstream and downstream directions, and are configured to route a working fluid through duct 10. Upstream annular portion 18 is connected to downstream annular portion 22 by bolts 26, which pass through upstream flange 16 and downstream flange 20 to seal upstream annular portion 18 to downstream annular portion 22.

Figure 2A:
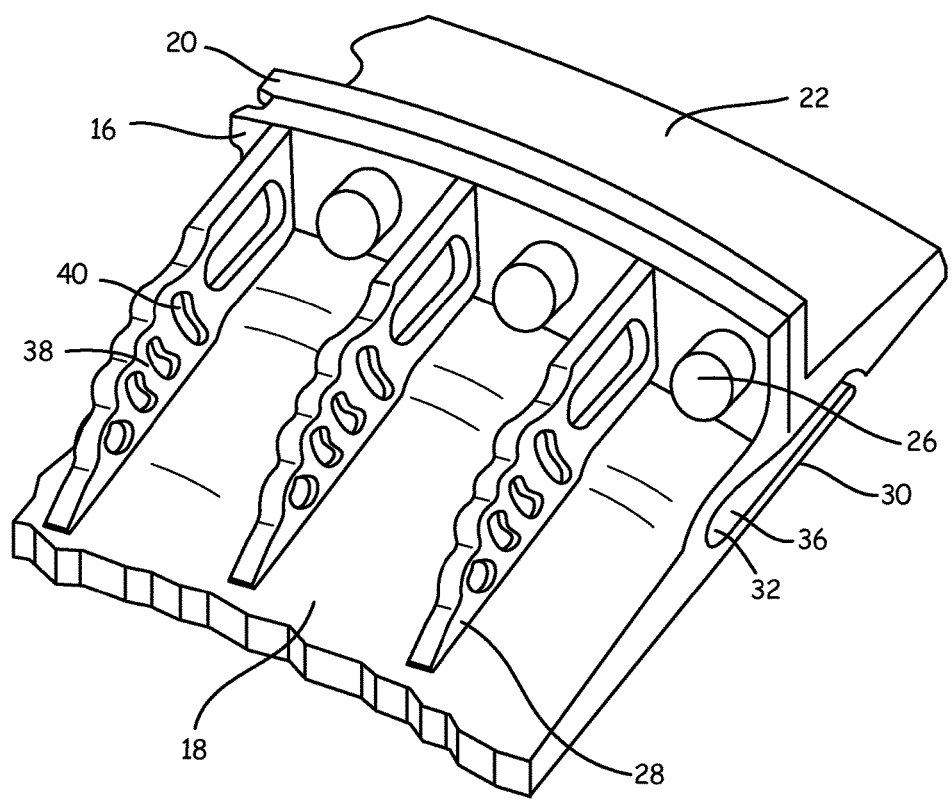
FIG. 2A is a cutaway perspective view of two duct segments bolted together via flanges, showing the integrated heat shield of the upstream duct segment.
Figure 2B:
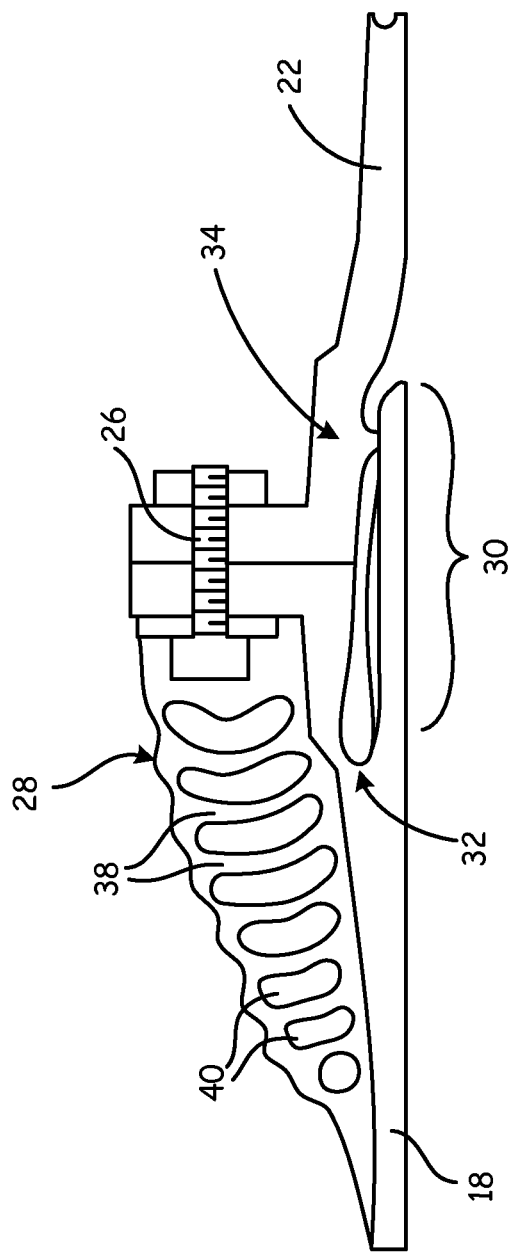
FIG. 2B is a cross-sectional view of the two duct segments bolted together via flanges, showing a stress reduction radius and sealing land.

Referring now to FIGS. 2A and 2B, integrated heat shield 30 and related structural support (e.g., struts or gussets 38) are provided in accordance with the present disclosure to reduce or eliminate scrubbing or erosion of inner surfaces of upstream and/or downstream duct portions 12, 14, which otherwise could be caused by working fluids flowing through the duct on account of temperatures and turbulent flow resulting from a stream or discontinuous junction between the upstream and downstream duct portions. Integrated heat shield 30 includes radiused plenum end 32 and sealing land 34, and at least partially defines heat shield plenum 36. Struts 38, optionally provided in conjunction with heat shield 30, can define apertures 40 (further discussed below).

It will be appreciated that the interface between upstream flange 16 and downstream flange 20, which could otherwise be susceptible to scrubbing from hot working fluid, is protected by integrated heat shield 30. Integrated heat shield 30 can be made of the same material as upstream annular portion 18. For example, integrated heat shield 30 can be made of a high temperature superalloy. Integrated heat shield 30 is a part of upstream annular portion 18. In some embodiments, integrated heat shield 30 and upstream annular portion 18 may be built together, for example in a casting or additive manufacturing process.

Radiused plenum end 32 is located at the intersection of integrated heat shield 30 and upstream annular portion 18. Radiused plenum end 32 is designed to provide structural support for retaining the attachment of integrated heat shield 30, by preventing stress concentrations that could cause integrated heat shield 30 from cracking off of upstream annular portion 18 as a result of the scrubbing action of hot working fluid passing by, or from thermal expansion and contraction. Sealing land 34 is located at the opposite end of integrated heat shield 30; that is, at the intersection of integrated heat shield 30 and downstream annular portion 22. Sealing land 34 protrudes from downstream annular portion 22 to form a seal with integrated heat shield 30.

Upstream flange 16, upstream annular portion 18, downstream flange 20, downstream annular portion 22, integrated heat shield 30, and sealing land 34 cooperate to define heat shield plenum 36. Heat shield plenum 36 is a relatively still pocket of fluid. Although heat shield plenum 36 may be heated by the passage of hot working fluid on the opposite side of integrated heat shield 30, the lack of vorticity and turbulent flow within heat shield plenum 36 protects the intersection of upstream flange 16 and downstream flange 20 from hot gas scrubbing.

Generally, it is desirable to keep the radially inner side of duct 10 (FIG. 1) smooth and free of protrusions. Because a portion of heat shield plenum 36 is a void in upstream annular portion 18, additional material may be needed to ensure sufficient structural support to upstream flange 16. Thermally compliant gussets 28 can provide such structural support.

Thermally compliant gussets 28 include struts 38, which define apertures 40. Thermally compliant gussets 28 can be tuned, or designed to provide a constant level of support for upstream flange 16 irrespective of its temperature. As previously described, complex geometries of struts 38 and apertures 40 can be grown using additive manufacturing. For example, struts 38 and the outboard beams of thermally compliant gussets 28 may be constructed with a curvature that is tuned to provide a balance of compliance and stiffness that minimizes thermally induced stresses in the presence of a thermal gradient.

Heat shield plenum 36 prevents scrubbing of the joint between upstream annular duct portion 18 and downstream annular duct portion 22. In applications where inclusion of heat shield plenum 36 reduces the structural integrity of the connection between upstream annular portion 18 and upstream flange 16, thermally compliant gussets 28 may be added.

Figure 3A:
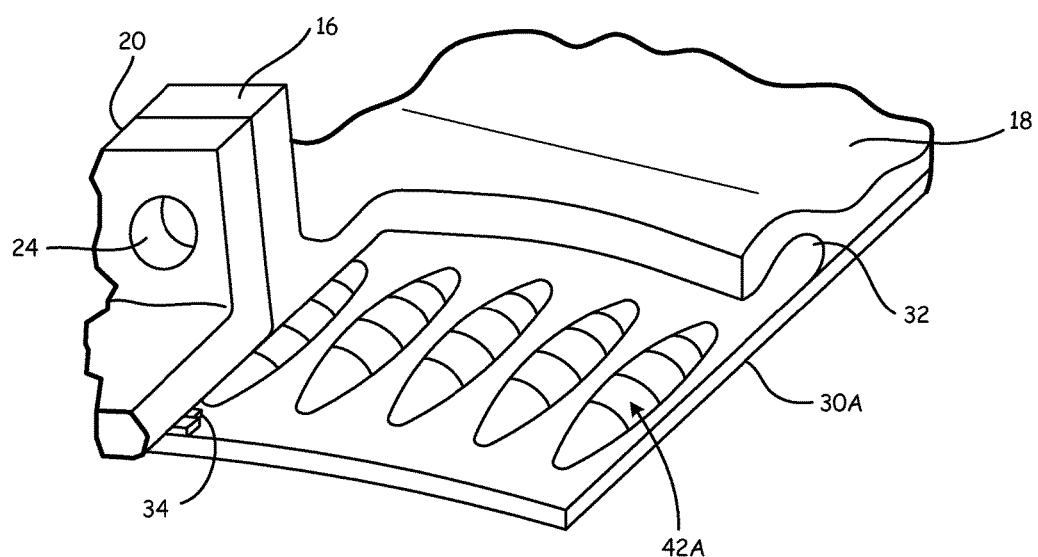
FIGS. 3A-3B are cutaway perspective views of stress reduction features arranged on an integrated heat shield.
Figure 3B:
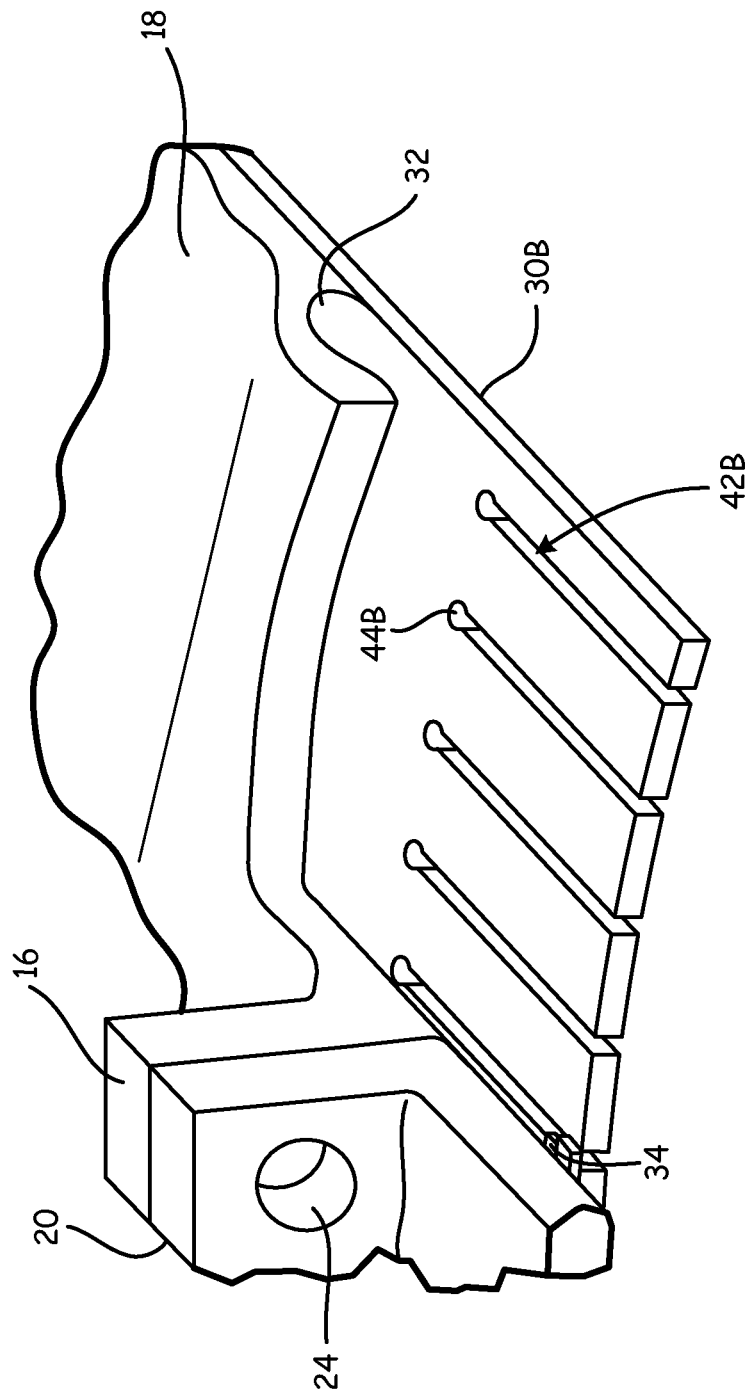

FIGS. 3A-3B are cutaway perspective views of stress reduction features arranged on integrated heat shields 30A and 30B, respectively. When integrated heat shield 30A is heated, rapid expansion can cause damage including cracking or buckling. In order to prevent such failure modes, beads 42A are indented into integrated heat shield 30A. Beads 42A provide a mechanism for stress within integrated heat shield 30A to be released. Beads 42A can bend to permit circumferential expansion of integrated heat shield 30A.

Similarly, spring fingers 42B of FIG. 3B provide a mechanism for stress within integrated heat shield 30B to be released. Spring fingers 42B include radiused ends 44B to prevent unwanted cracking. As integrated heat shield 30B expands, spring fingers 42B can bend to accommodate. Although spring fingers 42B provide ingress for working fluid to enter heat shield plenum 36 (FIGS. 2A-2B), spring fingers 42B provide sufficient impedance to fluid flow to prevent scrubbing.

Although heat shield 30 has been described herein as extending from upstream duct portion 12, it should be understood that in some embodiments, the configuration could be reversed and heat shield 30 could extend from downstream duct portion 14.

DISCUSSION OF EMBODIMENTS

The following are non-exclusive descriptions of possible embodiments of the present invention.

A duct includes an upstream segment and a downstream segment mounted to the upstream segment. A heat shield extends from one of the upstream and downstream segments. A sealing land extends from the other of the upstream and downstream segments, and is configured to engage with the heat shield.

The duct of the preceding paragraph can optionally include, additionally and/or alternatively, any one or more of the following features, configurations and/or additional components:

The upstream segment may include an upstream annular portion, an upstream flange extending radially outward from the upstream annular portion, and a gusset extending between and attached to the upstream annular portion and the upstream flange.

The gusset may include a plurality of radially extending struts, the plurality of struts defining apertures.

The gusset may be configured to provide support to the upstream flange across a temperature range.

The downstream segment may include a downstream annular portion and a downstream flange extending radially outward from the downstream annular portion and being configured to engage with the upstream flange.

The heat shield may be separated from the upstream flange and the downstream flange by a plenum defined in part by the heat shield and the upstream and downstream flanges.

The plenum may include a radiused plenum end in the upstream segment.

The upstream flange and the downstream flange may together define a bolt hole.

The heat shield may define a plurality of stress relief features.

The stress relief features may include beads indented into the integrated heat shield.

The stress relief features may include spring fingers cut into the integrated heat shield.

The spring fingers may include radiused finger ends.

The heat shield may be made of a high temperature superalloy.

A duct includes an upstream segment having an upstream annular portion and an upstream flange extending radially outward from the upstream annular duct portion and partially defining a bolt hole. The duct also includes a downstream segment mounted to the upstream segment, the downstream segment having a downstream annular portion mounted to the upstream annular portion and a downstream flange extending radially outward from the downstream annular duct portion and partially defining the bolt hole. A heat shield extends from one from the upstream and downstream segments.

The duct of the preceding paragraph can optionally include, additionally and/or alternatively, any one or more of the following features, configurations and/or additional components:

The upstream segment may include a gusset extending between and attached to the upstream annular portion and the upstream flange.

The gusset may include a plurality of radially extending struts, the plurality of struts defining apertures.

A duct includes an upstream segment, a downstream segment mounted to the upstream segment, and a heat shield extending from one of the upstream and downstream segments. The heat shield is separated from the upstream and downstream segments by a plenum defined in part by the heat shield and the upstream and downstream segments.

The duct of the preceding paragraph can optionally include, additionally and/or alternatively, any one or more of the following features, configurations and/or additional components:

The duct may include a sealing land extending from the other of the upstream and downstream segments and configured to engage with the heat shield to define the plenum in part.

The plenum may include a radiused plenum end opposite the sealing land.

The heat shield may define a plurality of stress relief features.

Although the present invention has been described with reference to preferred embodiments, workers skilled in the art will recognize that changes may be made in form and detail without departing from the spirit and scope of the invention.

The invention claimed is:

1. A duct for channeling a flow of a working fluid, comprising: an upstream segment, the upstream segment having an upstream annular portion and an upstream flange, wherein the upstream flange extends radially outward from the upstream segment; a downstream segment, the downstream segment having a downstream annular portion and a downstream flange, wherein the downstream flange extends radially outward from the downstream segment, and the downstream flange is configured to matingly contact the upstream flange so to attach the upstream segment to the downstream segment; and an integrated heat shield, the integrated heat shield being an extension from the upstream segment and extending toward the downstream segment, and the integrated heat shield having an inside surface and an outside surface, wherein the inside surface is in contact with the flow of the working fluid and the outside surface defines an inner boundary of an annular plenum; wherein the upstream segment and the downstream segment each have an inside surface proximate a region where the downstream flange matingly contacts the upstream flange, the upstream segment inside surface and the downstream segment inside surface together defining an outer boundary of the annular plenum; the annular plenum has a radiused plenum end and an open end; wherein the radiused plenum end is in the upstream segment and the open end is in an area proximate the downstream segment; wherein the open end is exposed to the working fluid; and wherein the radiused plenum end is closed, thereby not allowing flow of the working fluid through the annular plenum; and wherein the downstream segment includes a sealing land extending radially inward from the downstream segment and configured to contactingly engage with the outside surface of the integrated heat shield, and a plurality of spring fingers are formed in the integrated heat shield beneath the sealing land.

2. The duct of claim 1, wherein the upstream segment includes a gusset extending between and attached to the upstream annular portion and the upstream flange.

3. The duct of claim 2, wherein the gusset includes a plurality of radially extending struts, the plurality of struts defining apertures.

4. The duct of claim 1, wherein the upstream flange and the downstream flange together define a plurality of bolt holes.

5. The duct of claim 1, wherein the integrated heat shield defines a plurality of stress relief features.

6. The duct of claim 5, wherein the stress relief features include beads indented into the integrated heat shield, the beads configured to bend to permit circumferential expansion of the integrated heat shield.

7. The duct of claim 5, wherein the stress relief features include a plurality of axial cuts into the integrated heat shield thereby forming the plurality of spring fingers, each spring finger of the plurality of spring fingers having a length and a width, wherein: each length is greater than the width; each spring finger of the plurality of spring fingers has a radiused end proximate the radiused plenum end; and the plurality of axial cuts extend into the annular plenum.

8. The duct of claim 1, wherein the integrated heat shield is made of a high temperature superalloy.

9. The duct of claim 1, wherein the duct is a gas turbine engine duct.

10. A duct for channeling a flow of a working fluid, comprising: an upstream segment, the upstream segment having an upstream annular portion and an upstream flange, wherein the upstream flange extends radially outward from the upstream annular portion and partially defines a plurality of bolt holes; a downstream segment, the downstream segment having a downstream annular portion and a downstream flange, wherein the downstream flange extends radially outward from the downstream annular portion and partially defines the plurality of bolt holes; and wherein the downstream flange is configured to matingly contact the upstream flange so to attach the upstream segment to the downstream segment; and an integrated heat shield, the integrated heat shield being an extension from the downstream segment and extending toward the upstream segment, and the integrated heat shield having an inside surface and an outside surface, wherein the inside surface is in contact with the flow of the working fluid and the outside surface defines an inner boundary of an annular plenum; wherein the upstream segment and the downstream segment each have an inside surface proximate a region where the upstream flange matingly contacts the downstream flange, the upstream segment inside surface and the downstream segment inside surface together defining an outer boundary of the annular plenum; and wherein the annular plenum has a radiused plenum end and an open end; wherein the radiused plenum end is in the downstream segment and the open end in an area proximate the upstream segment; and wherein the open end is exposed to the working fluid; and wherein the radiused plenum end is closed, thereby not allowing flow of the working fluid through the annular plenum; and wherein the downstream segment includes a sealing land extending radially inward from the downstream segment and configured to contactingly engage with the outside surface of the integrated heat shield, and a plurality of spring fingers are formed in the integrated heat shield beneath the sealing land.

11. The duct of claim 10, wherein the upstream segment includes a gusset extending between and attached to the upstream annular portion and the upstream flange.

12. The duct of claim 11, wherein the gusset includes a plurality of radially extending struts, the plurality of struts defining apertures.

13. The duct of claim 10, wherein the integrated heat shield defines a plurality of stress relief features.

14. The duct of claim 13 wherein the stress relief features include beads indented into the integrated heat shield, the beads configured to bend to permit circumferential expansion of the integrated heat shield.

15. The duct of claim 13, wherein the stress relief features include a plurality of axial cuts into the integrated heat shield thereby forming the plurality of spring fingers, each spring finger of the plurality of spring fingers having a length and a width, wherein: each length is greater than the width; each spring finger of the plurality of spring fingers has a radiused end proximate the radiused plenum end; and the plurality of axial cuts extend into the annular plenum.

16. The duct of claim 10, wherein the integrated heat shield is made of a high temperature superalloy.

17. The duct of claim 10, wherein the duct is a gas turbine engine duct.

\* \* \* \* \*